UNITED STATES PATENT OFFICE.

JOSEPH H. CAMPBELL, OF NEW YORK, N. Y.

FOOD COMPOUND.

SPECIFICATION forming part of Letters Patent No. 668,160, dated February 19, 1901.

Application filed April 2, 1900. Serial No. 11,175. (No specimens.)

*To all whom it may concern:*

Be it known that I, JOSEPH H. CAMPBELL, a citizen of the United States, and a resident of the city, county, and State of New York, have invented certain new and useful Improvements in Food Products, of which the following is a specification.

My invention provides a food combining the fat-forming qualities of cereals with the tissue-forming qualities of animal food. More particularly, my food is a composition of matter containing cereals in the ordinary coarse or fine grained forms of commerce mixed with the desiccated non-fatty solids of milk in similar form, the proteids being in approximately as soluble and peptogenic condition as in normal milk.

All cereals, of which corn, oats, and wheat are the most abundantly used for food, contain a large percentage of starch, so large, in fact, as to give the cereal heating and fat-forming elements greatly in excess of the ratio of tissue-forming elements in an economical food. The non-fatty solids of milk, on the other hand, contain so large a percentage of protein matter that when eaten alone they supply an excess of tissue-forming elements. By combining these two ingredients I obtain a most economical food—that is, one in which there is little waste of tissue-forming elements and little danger of injury from an excess of fat-forming and heating elements. To obtain such a food, I condense and desiccate milk from which all the cream or fatty matter has been removed. In order to effect this condensation and desiccation at so low a temperature as to retain all the solid matters in unaltered condition and in so short a time as to avoid lactic fermentation, I preferably employ the process described in my application for patent, Serial No. 739,463, filed December 7, 1899. This process, in brief, consists in subjecting the milk to externally-applied heat, whereby it is maintained at a temperature below the coagulating-point of albumen and simultaneously blowing air into it in such volume that it is concentrated so rapidly as to prevent souring, continuing this concentration till it becomes of a pasty consistency, and then drying the pasty product by subdividing it and exposing it to the air at a temperature below the coagulating-point of albumen until desiccated. This desiccated milk is then reduced to grains of any degree of fineness, preferably the same as that of the cereal with which it is to be used. For example, for mixture with cornmeal the desiccated milk is reduced only to a granular condition of the same fineness as the meal, while for wheat-flour the grains are so fine as to make it practically a flour of milk. To make a more intimate mixture and to insure a uniformity in the fineness of the two ingredients, they may be mixed before the final grinding of the cereal and then ground together.

The process which I use for obtaining the milk solids insures that the protein matter in my food product shall have the same solubility and peptogenic quality as the proteids of fresh milk. As the protein matter is by far the most difficult to obtain in a natural state in manufactured food products and as it has never been so obtained from milk prior to my invention, the value of my product is apparent.

Though obviously the proportions will depend on the desired proportion of starchy matters to proteids in the cooked product to be made and may be varied within a considerable range, I will indicate the following as being most satisfactory in the experiments which I have made: For mixture with oatmeal or the like as a breakfast-food I use from thirty-three to sixty-six per cent. of desiccated milk; for mixture with cornmeal or wheat-flour to make plain bread, about five per cent. of desiccated milk; for biscuit, about ten per cent. of desiccated milk, and for cake a somewhat larger percentage. In addition to its value as a food from a scientific point of view it also marks a great advance from a commercial point of view. It furnishes a meal or flour from which so-called "milk-bread" may be made directly and in countries in which fresh milk cannot be had. It provides a cereal mixture richer, but very much cheaper, than any pure cereal now on the market. Bread made from the mixture with wheat-flour I have found in every case to be whiter and of better flavor than that made from the same wheat-flour used pure. I have also found that when made without lard, butter, or other shortening such bread has the crisp consistency and taste of ordinary biscuits or shortened bread, in the making of which considerable shortening is necessary.

Though I have described in detail the product of my invention and processes for making the same, yet I am not to be understood as limiting myself to the exact composition described. Many modifications—such, for example, as a product comprising sugar or well-known flavorings in addition to the ingredients specified—will readily suggest themselves to persons skilled in the art of manufactured products.

What I claim, therefore, and desire to secure by Letters Patent, is a food product distinguished by including in its composition the following-defined elements, all substantially as set forth in the foregoing specification:

1. A food product comprising a mixture of a cereal and desiccated non-fatty milk solids having their proteids in approximately as soluble and peptogenic condition as in normal milk.

2. A food product comprising a mixture of wheat-flour and desiccated non-fatty milk solids having their proteids in approximately as soluble and peptogenic condition as in normal milk.

In witness whereof I have hereunto signed my name in the presence of two subscribing witnesses.

JOSEPH H. CAMPBELL.

Witnesses:
 DOMINGO A. USINA,
 FRED WHITE.